United States Patent [19]

Walker

[11] 4,176,444

[45] Dec. 4, 1979

[54] METHOD AND APPARATUS FOR ASSEMBLING DYNAMOELECTRIC MACHINE STATORS

[75] Inventor: Robert G. Walker, Ossian, Ind.

[73] Assignee: Industra Products, Inc., Fort Wayne, Ind.

[21] Appl. No.: 834,106

[22] Filed: Sep. 19, 1977

[51] Int. Cl.² ............................................ H02K 15/06
[52] U.S. Cl. ........................................ 29/596; 29/606; 29/609; 29/736; 72/402; 310/42
[58] Field of Search ................ 29/596, 598, 606, 609, 29/736; 310/42, 216, 214; 72/120, 122, 402, 355

[56] References Cited

U.S. PATENT DOCUMENTS

| 3,802,066 | 4/1974 | Barrett ................................. 29/596 |
| 3,831,268 | 8/1974 | Boyd et al. ..................... 29/609 X |

*Primary Examiner*—Carl E. Hall
*Attorney, Agent, or Firm*—Albert L. Jeffers; Roger M. Rickert

[57] ABSTRACT

Method and apparatus for forming a stator for a dynamoelectric machine by inserting prewound coils into a slotted stator core includes enlarging the slot openings or gap between certain adjacent pairs of stator teeth, placing the prewound stator windings in selected stator core slots and thereafter reducing the slot opening or gap between those certain adjacent pairs of teeth. The disclosure apparatus includes a stator bore support and a series of punches to be placed in stator slots and collapsed radially inwardly to bend the stator teeth tips to conform to the bore support. An otherwise conventional coil inserting or injecting machine has unique blades, each of which has a pair of elongated depressions for accepting the respective formed stator teeth tips, and a pair of ribs outside the depression for spanning the corresponding tooth. Reforming of the stator teeth so as to provide a cylindrical bore stator may be accomplished by a plurality of cylindrical rollers which simultaneously engage the stator bore and traverse that bore interior surface to displace the stator teeth tips radially outwardly, thereby providing a wound stator for further processing having a substantially reduced iron gap or for a given iron gap containing windings of a larger wire size than normally insertable in a stator having that iron gap. The slot openings may be enlarged either by mechanical forming of the stator tooth tips or the stator laminations may be initially stamped with this deformation so that the stator core or stack of such laminations need not be mechanically formed to increase the iron gap available for the wire insertion process.

12 Claims, 10 Drawing Figures

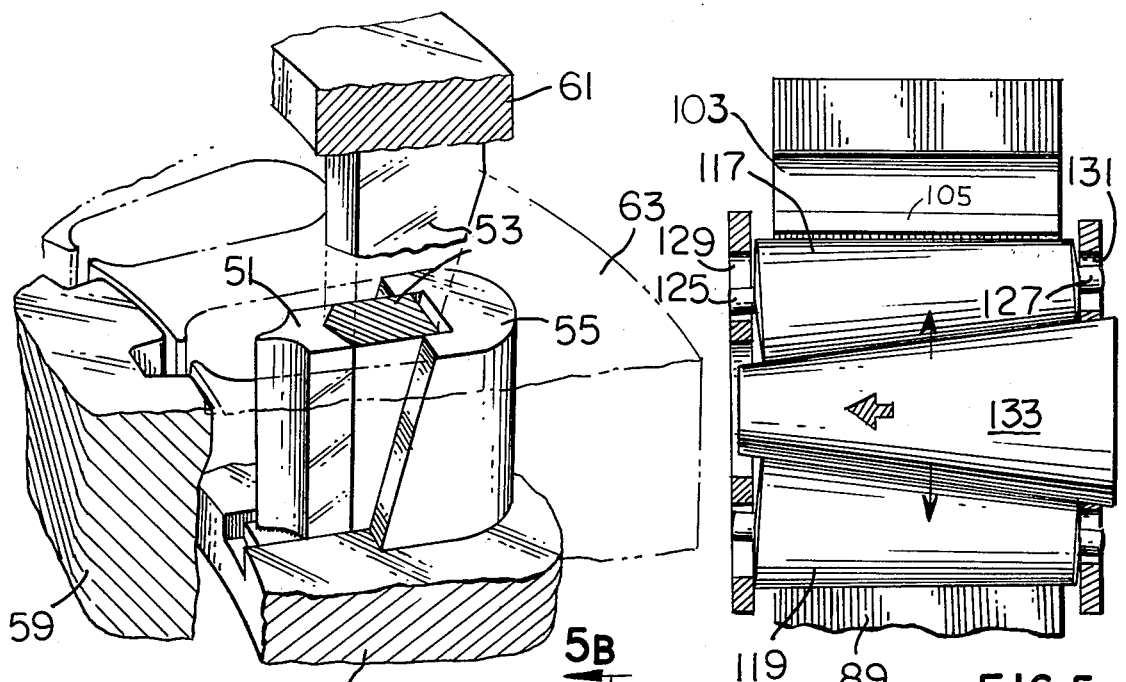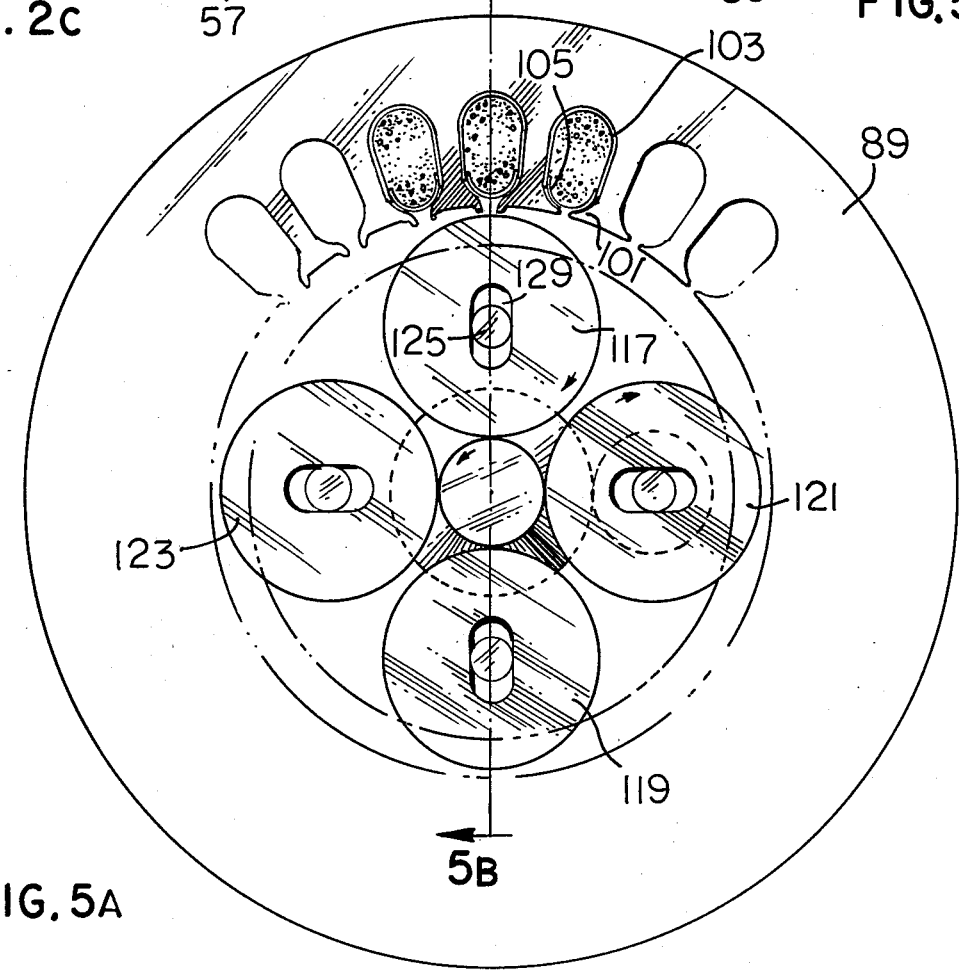

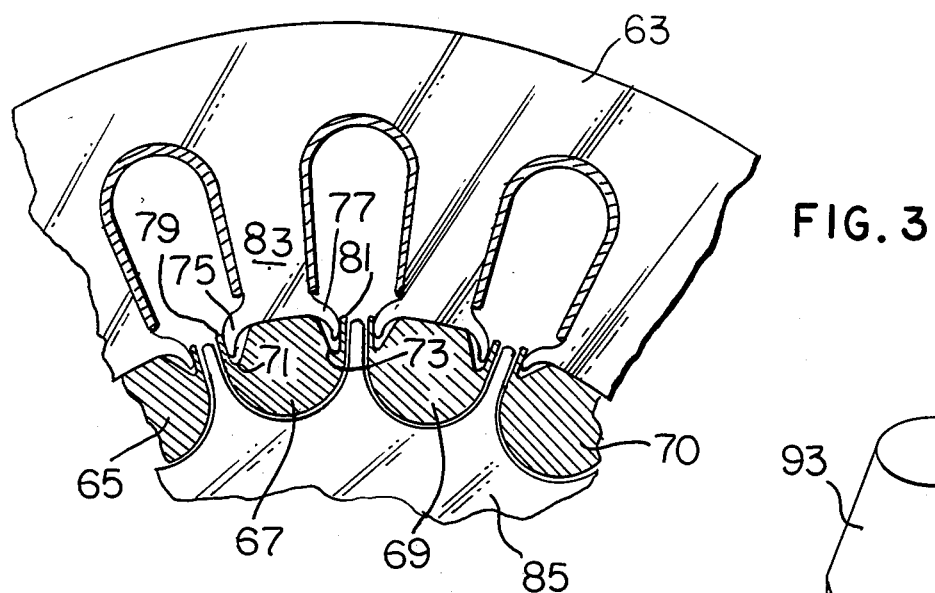
FIG. 3
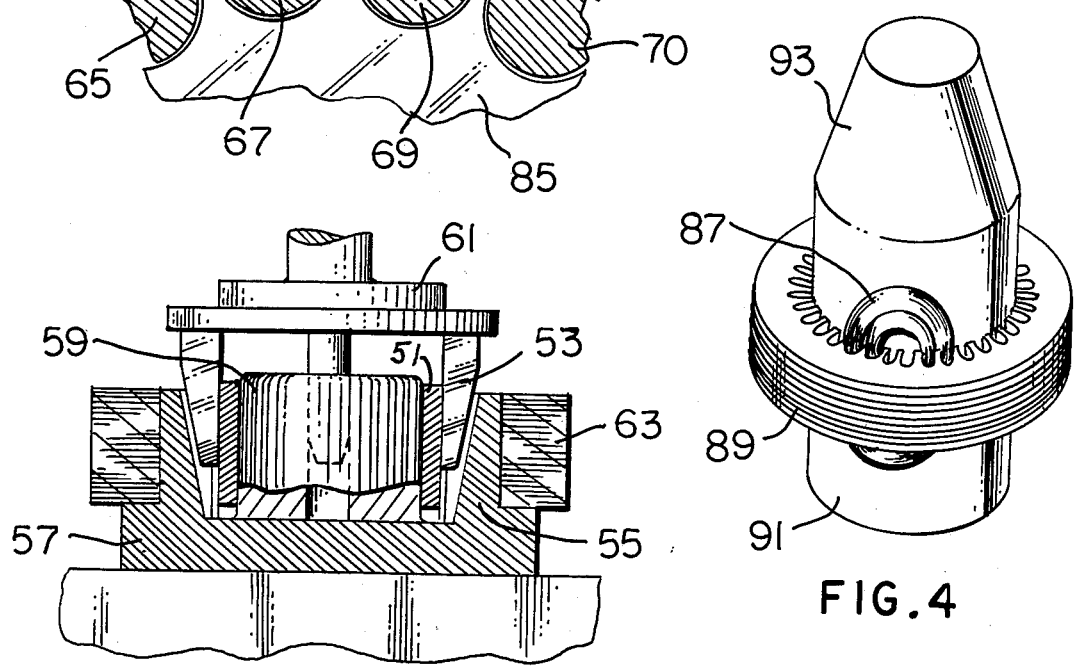
FIG. 2D
FIG. 4
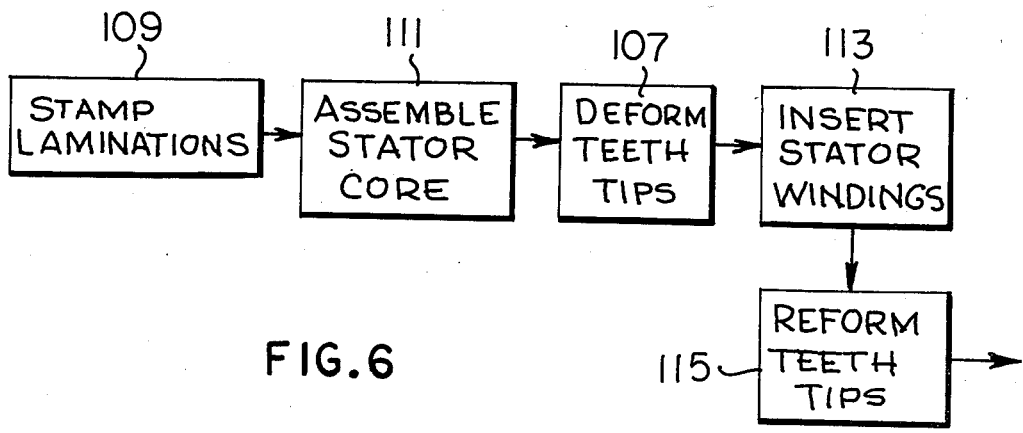
FIG. 6

METHOD AND APPARATUS FOR ASSEMBLING DYNAMOELECTRIC MACHINE STATORS

BACKGROUND OF THE INVENTION

The present invention relates generally to apparatus and techniques for producing electromagnetic devices and more particularly to such techniques and apparatus for making stators for dynamoelectric machines.

In the manufacture of a dynamoelectric machine stator, a number of relatively thin stator laminations are punched or stamped from a strip of material and stacked together to form a stator core typically having a centrally disposed axially extending generally cylindrical bore with a plurality of axially elongated slots communicating with that bore as defined by a like plurality of stator teeth separating adjacent slots. The stator teeth frequently have tips near the stator bore extending toward one another, forming a gap where the slot communicates with the bore. Windings are then disposed in the stator slots by either in-slot winding techniques or by forming the windings and then axially or radially inserting those windings into the appropriate core slot.

The size wire which may be used in a stator winding is limited by the gap between adjacent pairs of stator teeth, or stating the same fact in a different manner, for a given size wire the gap between adjacent stator teeth must be sufficiently larger to admit that size wire. While different considerations prevail for the different techniques of placing the windings in the stator core slots, the slot gap still limits the wire size, or the wire size limits the slot gap, and this gap can not be further reduced, or the wire size increased, according to the known stator fabricating techniques.

SUMMARY OF THE INVENTION

Among the several objects of this invention may be noted the provision of a dynamoelectric machine stator fabricating technique for increasing the wire size and/or decreasing the gap between adjacent stator teeth as compared to the known fabricating techniques; the provision of method and apparatus for improving dynamoelectric machine efficiency; the provision of an improved process for inserting prewound coils into the slots of stator cores; and the provision of a method for making a stator for a dynamoelectric machine which overcomes the limitation imposed by the dimension of the gap between adjacent stator teeth.

In general, a process for inserting prewound coils into the slots of stator cores, in one form of the invention, includes enlarging certain of the core slot openings, passing prewound coils through selected enlarged slot openings, and reducing the certain slot openings to provide the wound stator.

Also in general, a method of making a stator for a dynamoelectric machine having a stator core with a centrally disposed axially extending generally cylindrical bore, and with a plurality of axially elongated slots communicating with that bore, and a like plurality of stator teeth separating adjacent slots, with adjacent tips of the stator teeth forming a gap where the slots communicate with the bore, in one form of the invention, includes enlarging the gap between at least certain adjacent pairs of teeth, placing stator windings in selected slots, and reducing the gap between the at least certain adjacent pairs of teeth.

Still further, and in general, in one form of the present invention, an apparatus for assembling coils in the slots of stators and the like includes a stator bore support for engaging and supporting a stator core, along with punches or other means for forming stator teeth tips radially inward to conform the teeth to the bore support. A plurality of generally circularly disposed parallel extending blades support the coils and stator core while a stripper or other member moves along the blades for forcing coils along the blades and into stator core slots. The stator teeth tips are then reformed radially outward to provide a cylindrical bore stator by, for example, a plurality of cylindrical rollers, which simultaneously engage and traverse the stator bore interior, displacing the stator teeth tips radially outwardly to the positions they occupied prior to forming.

BRIEF DESCRIPTION OF THE DRAWING

FIGS. 2A, 2B, 2C and 2D illustrate apparatus for enlarging the iron gap between certain adjacent pairs of stator core teeth;

FIG. 3 illustrates a stator portion with enlarged gap in position on modified coil inserting equipment;

FIG. 4 is a perspective view of a stator and one device for reducing the previously enlarged gap between certain adjacent pairs of stator core teeth;

FIGS. 5A and 5B are end and partial section views respectively of a portion of a stator in conjunction with another device for reducing the gap between certain adjacent pairs of stator core teeth; and FIG. 6 is a block diagram illustrating one method of stator fabrication according to the present invention.

Corresponding reference characters indicate corresponding parts throughout the several views of the drawing.

The exemplifications set out herein illustrate the invention in one form thereof and such exemplifications are not to be construed as limiting in any manner the scope of the invention.

DESCRIPTION OF THE PREFERRED EMBODIMENT

Figure 1:
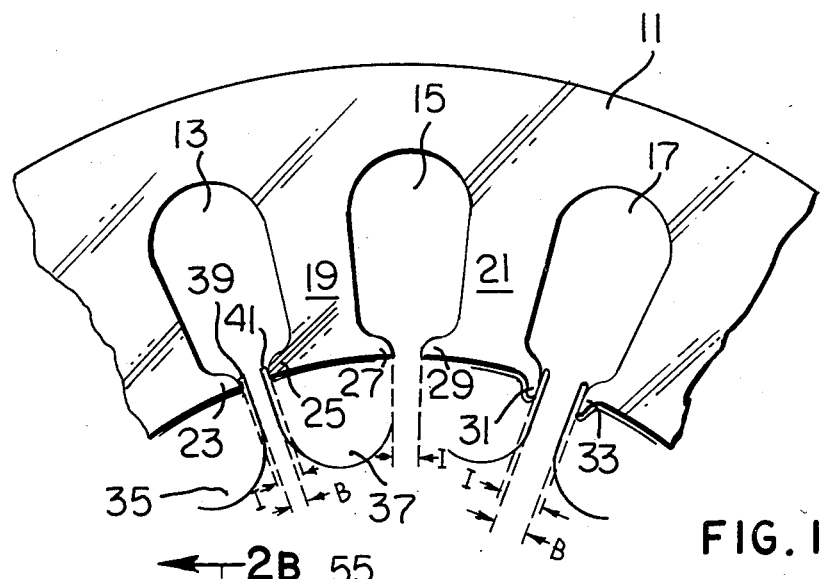
FIG. 1 is a partial end view of a dynamoelectric machine stator core comparing the techniques of the present invention to known prior art.

In FIG. 1 a stator core 11 has slots 13, 15 and 17 into which windings are to be placed either by directly winding in the selected slots or by preforming the winding and axially or radially placing that preformed winding in the slots. Each adjacent pair of slots has one side thereof defined by a stator tooth such as 19 or 21, and adjacent pairs of such stator teeth have tips 23, 25, 27, 29, 31 and 33, which define therebetween an iron gap through which the wire or winding must pass to be placed in the stator core.

A conventional iron gap I is depicted between the tips 27 and 29.

For the axial insertion of prewound coils, a stator core is placed on a plurality of generally circularly disposed parallel extending blades which support coils as well as that stator core, and a stripper or other device moves along the blades, moving the coils therealong and into stator core slots. Such axial insertion of prewound coils is illustrated, for example, in U.S. Pat. No. 2,432,267 to Adamson, U.S. Pat. No. 3,324,536 to Hill, and U.S. Pat. No. 3,402,462 to Walker et al. A representative pair of such blades 35 and 37 are illustrated in FIG. 1, and such blades typically have lips 39 and 41 which overlie the respective stator teeth tips 23 and 25 to protect the winding from the relatively rough stator core during the insertion process. Thus, such inserter blades, and particularly the lips 39 and 41, reduce the gap available for the insertion process from the iron gap I down to the blade gap B, as illustrated. A larger blade gap, of course, facilitates the insertion process and allows windings of a larger wire size to be inserted, if desired. The larger blade gap, of course, necessitates a greater iron gap, which greater iron gaps may lead in the resultant motor to decreases in operating efficiency.

Greater blade gap without a concomitant increase in iron gap and/or a decreased iron gap without a concomitant decrease in blade gap may be achieved by forming the stator teeth tips, as illustrated, by tips 31 and 33. The iron gap I and blade gap B for slot 13, as depicted, illustrate the conventional approach to this problem, however, an iron gap, as illustrated for slot 15, nearly the same as the blade gap B illustrated for slot 17, may be achieved by deforming the tooth tips to a new wider iron gap I in the manner illustrated for slot 17. This deformation, as illustrated for tips 31 and 33, may of course be provided by the stator lamination punching or stamping die, with no enlarging of the gap between certain adjacent pairs of teeth occurring after the stator lamination is formed, however, since blanks for rotor laminations are frequently formed from the central portion stamped out of the stator lamination, such a die configuration may be undesirable, in which event the enlarging of the gaps between the pairs of teeth may take place after initial stamping of the stator laminations.

Figure 2A:
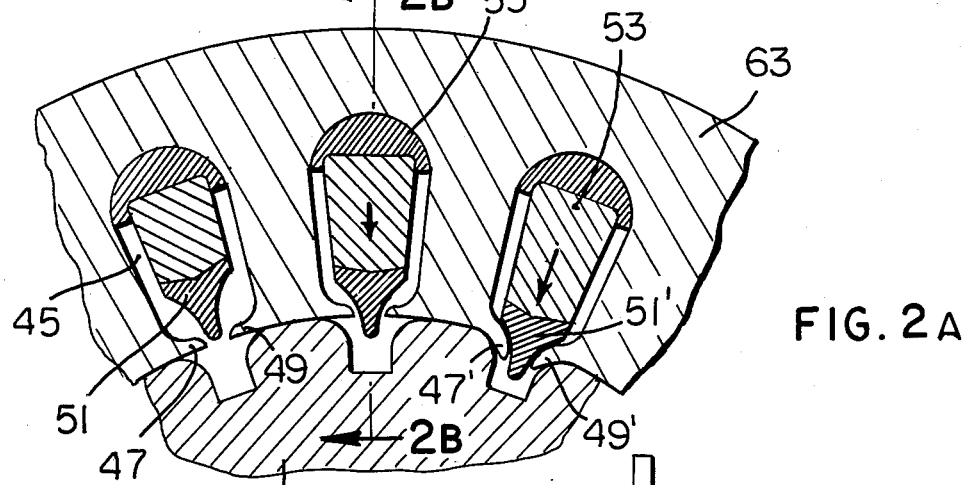
Figure 2B:
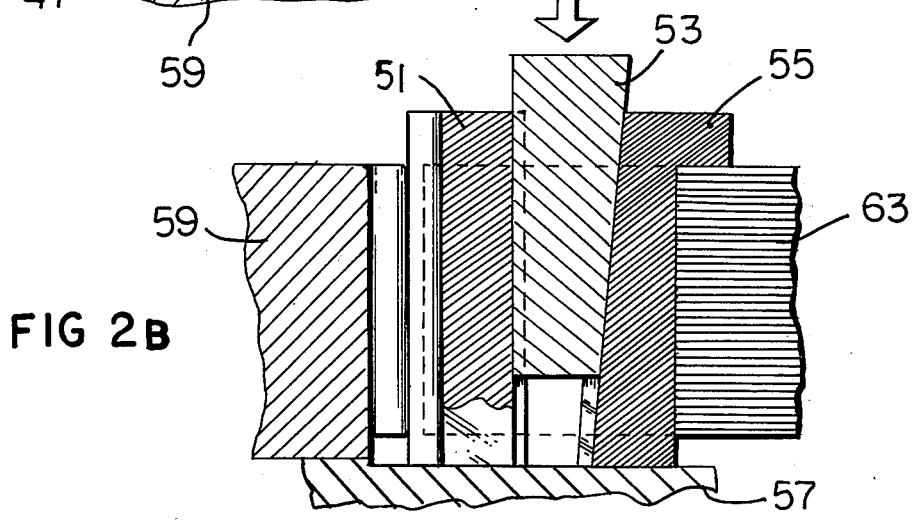

In FIG. 2, a punch 51 has been axially inserted into the stator slot 45, and when forced radially inward to the position illustrated as 51', functions to deflect the adjacent stator teeth tips 47 and 49 toward the stator bore and into the positions 47' and 49', thereby increasing the iron gap. In practice, a number of such punches, such as 51, would be generally circularly disposed, and alignable and axially insertable into the appropriate stator slots simultaneously. To enlarge the several slot openings, pairs of wedge shaped members, such as 53 and 55, are relatively moved to urge the respective punches in a collapsing or radially inward direction to simultaneously form as many tooth tips as desired for the particular winding insertion process. Wedge shaped member 55 may be affixed to a base 57, which base fixedly supports a bore support member 59, and which supports the several punches, such as 51, in a movable manner. A second frame member 61 may movably support the several wedges, such as 53, with wedges 53 and punches 51, for example, being spring loaded in a radial outward direction. Proper alignment of a stator core 63 and the upper and lower frame members 57 and 61 allows the simultaneous alignment of a punch and pair of wedge shaped members in each stator slot and forcing the frame portions 57 and 61 toward one another, simultaneously deforms each pertaining pair of tooth tips. The actual bend or deformation given a tooth tip in this process, of course, depends upon the configuration of punch 43, as well as the configuration of the adjoining bore support portion of bore support 59. After forming in this manner, the stator core has the tooth configuration illustrated in FIG. 3.

In FIG. 3, the windings to be inserted are placed over inserter blades, such as 65, 67 and 69, which are circularly disposed and parallel extending blades similar to those disclosed in the aforementioned U.S. Pat. Nos. 3,324,536 and 3,402,462 with insertion occurring in the manner disclosed therein. It will be noted, however, that these blades differ from those of the prior art in having a pair of elongated depressions 71 and 73 for accepting the respective formed stator teeth tips 75 and 77, as well as a pair of ribs 79 and 81 outside the depressions 71 and 73 for spanning the corresponding tooth 83. A stripper 85 is then passed through the stator bore to axially insert the windings in a conventional manner.

With windings, such as 87, disposed in the stator slots, stator 89 of FIG. 4 may simply be passed over a cylindrical forming tool 91 to deform the stator teeth tips radially outwardly to return the stator bore to its cylindrical configuration, while reducing the gap between adjacent pairs of teeth, providing more narrow slot openings than would be otherwise achievable. Forming tool 91 would, of course, have the diameter of its main cylindrical portion nearly identical to the diameter of the finished stator bore and may include a tapered portion 93 to aid the passage of the stator over the tool and to cause the reforming of the stator tooth tips to be somewhat progressive.

The stator bore may be returned to a cylindrical configuration and the gap between adjacent pairs of teeth reduced by reforming the previously deformed tips employing rollers, such as 117, 119, 121 and 123 in FIGS. 5A and 5B. The rollers engage and rollingly traverse the stator bore interior to displace the stator teeth tips, such as 101, radially outwardly to their final position. The rollers may be cylindrical and rigidly positioned about a circle so that their outermost surfaces coincide with the completed stator bore. If the rollers are fixed in location, they are spaced and sized so that a stator may be placed thereover with the deformed tips falling between rollers, whereupon the stator revolves relative to the rollers to deform the stator teeth tips. Alternately, the rollers 117, 119, 121 and 123 may be tapered and movable outwardly generally perpendicular to their respective axes by cams or the tapered roller 133 or otherwise to create a progressive reforming of the stator teeth tips, as desired.

The reforming of the stator teeth is rather easily achieved by the apparatus illustrated in FIGS. 5A and 5B. The stator 89 with its deformed stator tooth tips is placed over the four tapered rollers 117, 119, 121 and 123, and thereafter the tapered central roller 133 is forced toward the several opposingly tapered rollers to urge those four rollers outwardly to reform the stator bore. The four outer rollers have their axles, such as 125, disposed in elongated slots, such as 129, at either end of each roller so as to allow the free radial movement of those four rollers when urged outwardly and into engagement with the stator bore.

From the foregoing it is now apparent that a novel method and apparatus for fabricating dynamoelectric machine stators has been presented meeting the objects and advantageous features set out hereinbefore as well as others. Numerous modifications will readily suggest themselves to those of ordinary skill in this art. For example, insulative slot liners 103 and bore wedges 105 may be inserted in the stator in the conventional manner and numerous techniques may be employed in deforming and reforming the pertaining stator tooth tips. Thus, for example in the process depicted in FIG. 6, the step 107 of deforming these teeth tips may be incorporated into the steps 109 of stamping the stator laminations, as earlier discussed. The laminations may be assembled at 111 to form a stator core by the conventional welding or bolting together of those laminations or by cleating techniques currently in use in the stator core fabricating art. The step of inserting stator windings at 113 may include the insertion of insulating and bore wedges, and may be a single insertion step of a single winding, or several insertion steps of different windings, or may even be the contemporaneous insertion of a plurality of different windings. The present invention may also be advantageously employed with other winding techniques such as in-slot and hand-placed winding. Two techniques, both of which deviate the stator tooth tips radially inwardly, have been disclosed, however, those tooth tips may be deviated in other ways or in other directions, as desired, so as to increase the iron gap therebetween. Two techniques for the reforming step 115 have been disclosed, however, other approaches could be employed. These and other modifications may be made by those having ordinary skill in the art without departing from the spirit of the invention or the scope thereof as illustrated by the claims which follow.

I claim:

1. A method of making a stator for a dynamoelectric machine having a stator core with a centrally disposed axially extending generally cylindrical bore, a plurality of axially elongated slots communicating with the bore and a like plurality of stator teeth separating adjacent slots, adjacent tips of the stator teeth forming a gap where the slots communicate with the bore and comprising the steps of:
   enlarging the gap between at least certain adjacent pairs of teeth throughout substantially the entire axial extent thereof;
   assembling stator windings in selected slots including slots the associated gap of which has been enlarged; and
   reducing the gap between the at least certain adjacent pairs of teeth throughout substantially the entire axial extent thereof.

2. The method of claim 1 wherein the gaps which are enlarged and then reduced include at least all those gaps associated with the selected slots.

3. A process for inserting prewound coils into the slots of a stator core having an axially extending bore and slot openings about the periphery of the bore comprising the steps of:
   enlarging certain of the slot openings throughout substantially the entire axial extent thereof;
   passing prewound coils through selected enlarged slot openings; and
   reducing the certain slot openings throughout substantially the entire axial extent thereof.

4. The process of claim 3 wherein the step of enlarging includes passing a number of punches axially each into a separate stator slot, collapsing the punches radially inward to deflect the tips of adjacent stator teeth toward the stator bore, and axially removing the number of punches from the stator slots.

5. The process of claim 4 wherein the step of reducing includes forcing the deflected stator teeth tips radially outward to form a cylindrical stator bore.

6. A method of making a stator for a dynamoelectric machine having a stator core with a centrally disposed axially extending generally cylindrical bore, a plurality of axially elongated slots communicating with the bore and a like plurality of stator teeth separating adjacent slots, adjacent tips of the stator teeth forming a gap where the slots communicate with the bore and comprising the steps of:
   enlarging the gap between at least certain adjacent pairs of teeth by deforming adjacent stator teeth tips radially inward;
   assembling stator windings in selected slots including slots the associated gap of which has been enlarged; and
   reducing the gap between the at least certain adjacent pairs of teeth.

7. The method of claim 6 wherein the gaps are reduced by reforming the stator teeth tips radially outward to return the stator bore to a cylindrical form.

8. The method of claim 6 wherein the step of enlarging includes radially supporting stator teeth between the teeth tips.

9. A process for inserting prewound coils into the slots of a stator core having an axially extending bore and slot openings about the periphery of the bore comprising the steps of:
   enlarging certain of the slot openings by deforming adjacent stator teeth tips radially inward;
   passing prewound coils through selected enlarged slot openings; and
   reducing the certain slot openings.

10. The process of claim 9 wherein the slot openings are reduced by reforming the stator teeth tips radially outward to return the stator bore to a cylindrical form.

11. The process of claim 9 wherein the step of enlarging includes radially supporting stator teeth between the teeth tips and deforming adjacent teeth tips.

12. A process for inserting prewound coils into the slots of a stator core having an axially extending bore and slot openings about the periphery of the bore comprising the steps of:
   stamping stator laminations with non-circular bores having radially inwardly opening slots and deviating from a circular configuration by having segments near the slot openings protruding radially inward;
   stacking a plurality of laminations with the slot openings thereof in general alignment;
   joining the lamination stack together to form a stator core;
   passing prewound coils through selected slot openings; and
   reducing the slot openings by deforming the segments outwardly to form a generally circular bore.

* * * * *